US006218001B1

(12) United States Patent
Chen et al.

(10) Patent No.: US 6,218,001 B1
(45) Date of Patent: Apr. 17, 2001

(54) SURFACE COVERINGS CONTAINING DISPERSED WEAR-RESISTANT PARTICLES AND METHODS OF MAKING THE SAME

(75) Inventors: Hao A. Chen, Chaddi Ford, PA (US); Richard Judd; Isaac B. Rufus, both of Newark, DE (US)

(73) Assignee: Mannington Mills, Inc., Salem, NJ (US)

( * ) Notice: Subject to any disclaimer, the term of this patent is extended or adjusted under 35 U.S.C. 154(b) by 0 days.

(21) Appl. No.: 09/014,912

(22) Filed: Jan. 28, 1998

Related U.S. Application Data

(63) Continuation-in-part of application No. 08/956,022, filed on Oct. 22, 1997.

(51) Int. Cl.[7] ........................ B32B 5/16

(52) U.S. Cl. ........................ 428/323; 428/328; 428/329; 428/331

(58) Field of Search ........................ 428/323, 328, 428/329, 331

(56) References Cited

U.S. PATENT DOCUMENTS

| | | | | |
|---|---|---|---|---|
| Re. 36,359 | * | 10/1999 | Ebashi et al. | 530/350 |
| 3,726,952 | * | 4/1973 | Boden et al. | 264/48 |
| 3,787,229 | * | 1/1974 | Rudness | 117/132 BE |
| 3,916,046 | | 10/1975 | Youngberg | 428/31 |
| 3,953,218 | * | 4/1976 | Pollard | 106/19 |
| 4,013,598 | * | 3/1977 | Evans et al. | 428/413 |
| 4,314,924 | | 2/1982 | Haubennestel et al. | 260/30.6 |
| 4,417,008 | * | 11/1983 | Salensky et al. | 523/442 |
| 4,501,790 | | 2/1985 | Aizawa et al. | 428/283 |
| 4,647,647 | | 3/1987 | Haubennestel et al. | 528/83 |
| 4,762,752 | | 8/1988 | Haubennestel et al. | 428/407 |
| 4,795,796 | | 1/1989 | Haubennestel et al. | 528/28 |
| 4,857,111 | | 8/1989 | Haubennestel et al. | 106/504 |
| 5,077,112 | * | 12/1991 | Hensel et al. | 428/76 |
| 5,151,218 | | 9/1992 | Haubennestel et al. | 252/351 |
| 5,188,876 | | 2/1993 | Hensel et al. | 428/76 |
| 5,360,914 | * | 11/1994 | Inoue et al. | 548/546 |
| 5,405,674 | | 4/1995 | Wang et al. | 428/158 |
| 5,425,986 | | 6/1995 | Guyette | 428/283 |
| 5,458,953 | | 10/1995 | Wang et al. | 428/195 |
| 5,487,939 | | 1/1996 | Phillips et al. | 428/334 |
| 5,554,671 | * | 9/1996 | Craun et al. | 523/408 |
| 5,578,548 | * | 11/1996 | Bjork et al. | 503/202 |
| 5,733,644 | * | 3/1998 | Tanaka et al. | 428/215 |
| 5,800,904 | * | 9/1998 | Hallman et al. | 428/156 |
| 5,817,402 | * | 10/1998 | Miyake et al. | 428/159 |
| 5,830,937 | * | 11/1998 | Shalov et al. | 524/297 |
| 5,858,160 | * | 1/1999 | Piacente et al. | 156/279 |
| 5,876,551 | * | 3/1999 | Jackson | 156/307 |
| 5,902,663 | * | 5/1999 | Justesen et al. | 428/95 |
| 5,910,358 | * | 6/1999 | Thoen et al. | 428/316.6 |
| 5,928,778 | * | 7/1999 | Takahashi et al. | 428/323 |
| 6,008,462 | * | 12/1999 | Soltwedel | 219/91.2 |
| 6,022,919 | * | 2/2000 | Komoto et al. | 524/430 |

FOREIGN PATENT DOCUMENTS

| | | |
|---|---|---|
| 1237244 | 2/1968 | (DE) . |
| WO 94/01406 | 1/1994 | (WO) . |

* cited by examiner

*Primary Examiner*—H. Thi Le
(74) *Attorney, Agent, or Firm*—Kilyk & Bowersox, P.L.L.C.

(57) ABSTRACT

A surface covering comprising at least one layer containing wear-resistant particles, such as aluminum oxide, is disclosed. Preferably, the wear-resistant particles are present in the outermost layer of the surface covering which is exposed to the environment. A method to improve wear and/or stain resistance to a surface covering is also disclosed and includes adding an effective amount of wear-resistant particles to a top coat layer or outermost layer of a surface covering optionally, with the use of a suspension aid. Methods of making the surface covering are also disclosed.

34 Claims, 6 Drawing Sheets

SURFACE COVERINGS CONTAINING DISPERSED WEAR-RESISTANT PARTICLES AND METHODS OF MAKING THE SAME

BACKGROUND OF THE INVENTION

This application is a continuation-in-part of U.S. Patent Application entitled "Surface Coverings Containing Aluminum Oxide," filed Oct. 22, 1997, assigned application Ser. No. 08/956,022, which is incorporated in its entirety herein by reference.

The present invention relates to surface coverings, such as resilient floor coverings or wallpaper, and further relates to methods of preparing the same. The present invention also relates to methods to improve wear and/or stain resistance of surface coverings.

Present surface coverings, such as resilient flooring, can contain a resilient support surface, a wear surface, and a wear layer top coat. The top coat, in situations where the surface covering is a resilient floor, is subjected to foot traffic and wear from carts and other heavy objects coming in contact with the wear layer top coat. As a result, the top coat deteriorates leading to the exposure of lower layers of the resilient floor such as the wear layer base coat, a print layer or even the resilient support surface. When the lower layers are exposed and subjected to the environment including foot traffic and other objects, the resilient floor becomes unsightly (e.g., dirty, difficult to clean and susceptible to stains) and can also be partially or completely destroyed.

While efforts have been made to create more resilient surface coverings, especially in the flooring industry, such efforts have not totally solved the problem of making the wear top coat more resilient to the environment it is subjected to. Efforts to make the top coat more resilient have included radiation curable urethane topcoats, waterbase urethane, acrylic, or melamine coatings and the like. However, none of these efforts have proven totally satisfactory. Accordingly, there is a need for an improved surface covering which is more resilient to wear and staining.

SUMMARY OF THE INVENTION

Accordingly, a feature of the present invention is to provide a surface covering which has improved wear and/or stain resistance.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawing and appended claims.

To achieve these and other advantages and in accordance with the purpose of the present invention, as embodied and broadly described herein, the present invention relates to a surface covering comprising at least one layer which contains wear-resistant particles, like aluminum oxide, dispersed therein. Preferably, the wear-resistant particles are present as part of the outermost layer or top coat layer.

The present invention further relates to a method to improve wear and/or stain resistance to a surface covering. This method includes the steps of adding an effective amount of wear-resistant particles, like aluminum oxide, to a top coat layer or to a formulation which is used to form a top coat layer with the use of a suspension aid preferably comprising a polyamine amide or a polyamide.

This invention further relates to a method of making a surface covering which includes the steps of forming a layer comprising wear-resistant particles, like aluminum oxide. Preferably, this layer is a top coat layer or the outermost layer.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
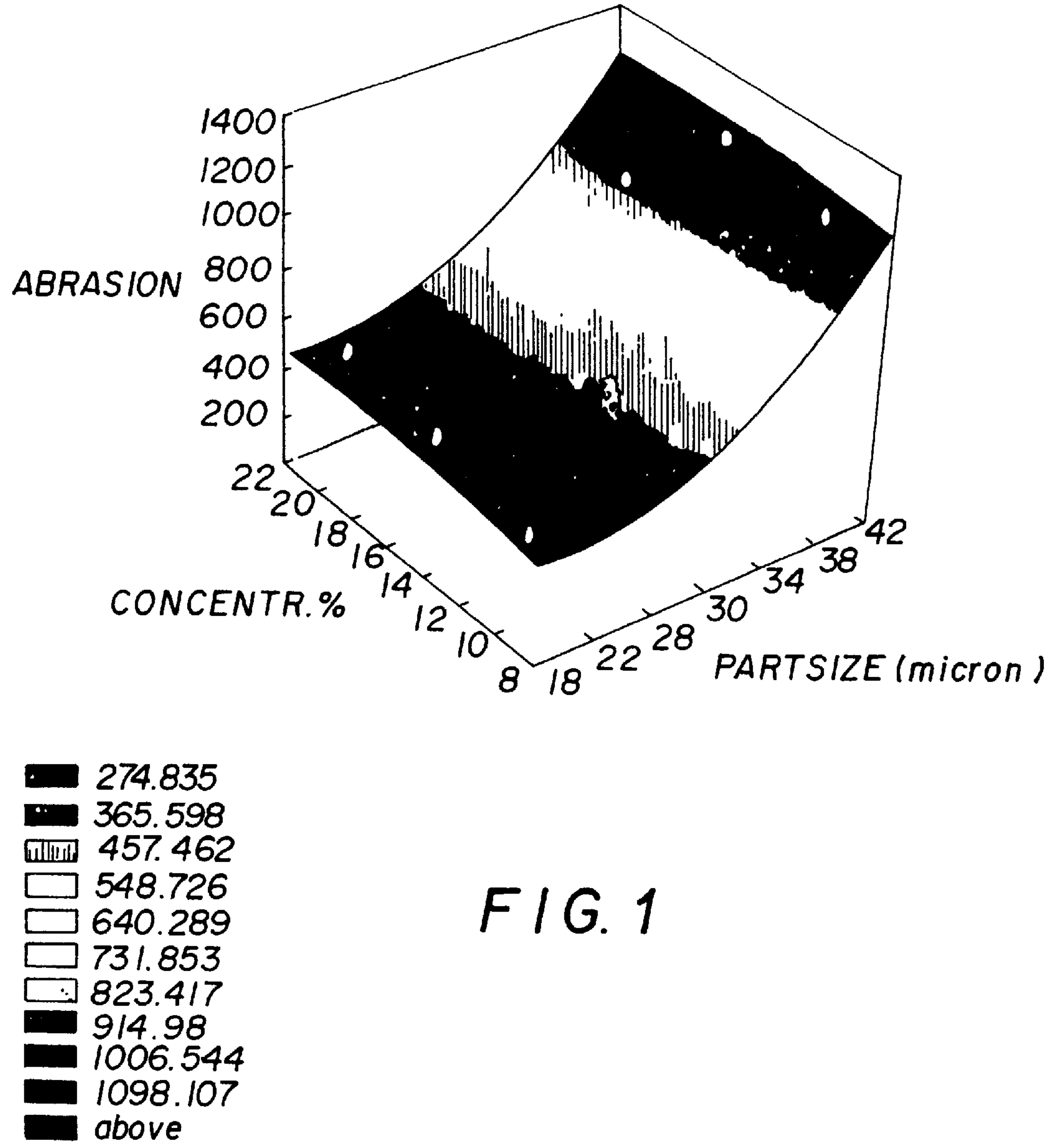
FIG. 1 is a graph showing the relationship between particle size of $Al_2O_3$ and concentration and abrasion resistance.
Figure 2:
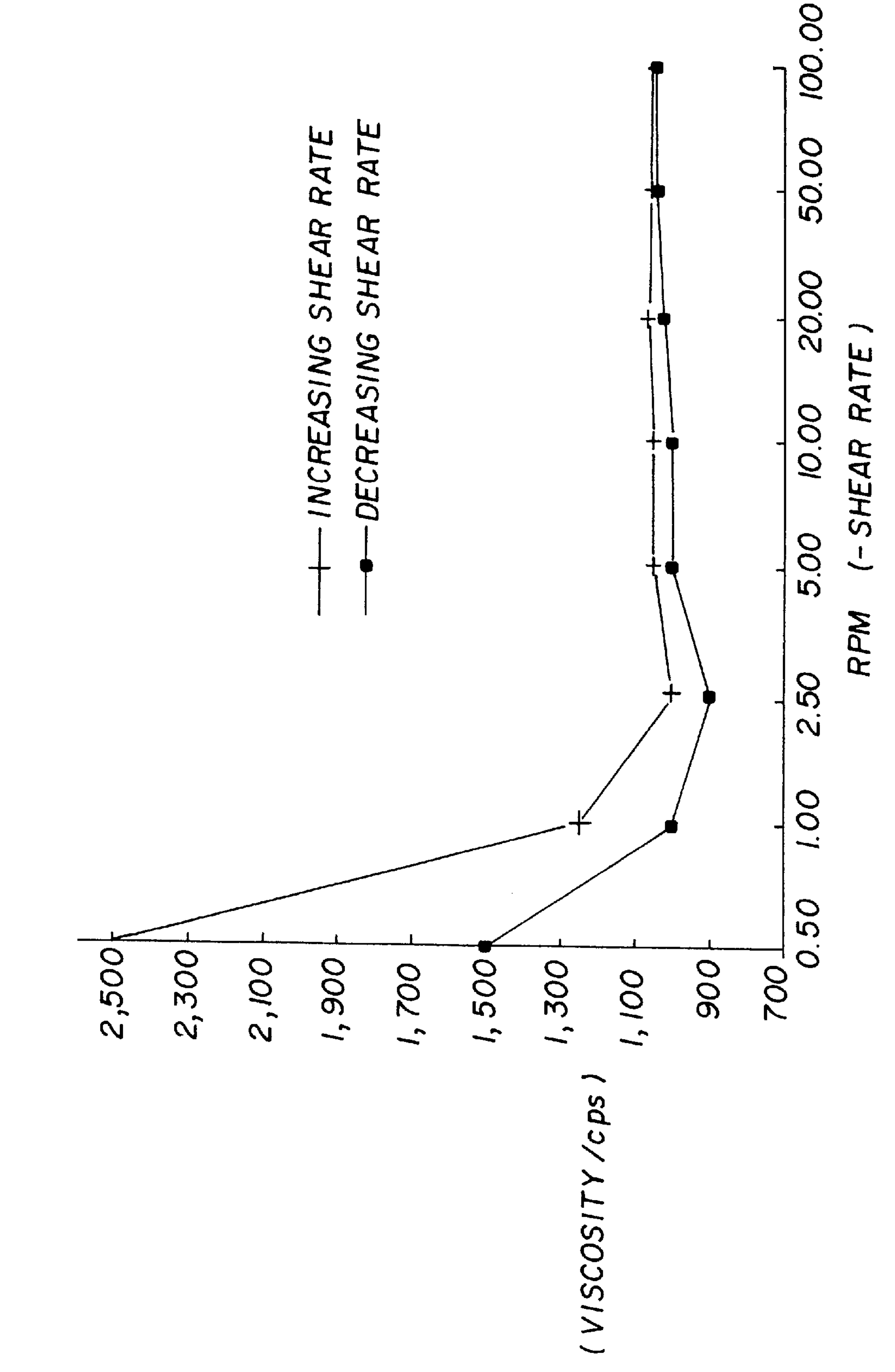
FIGS. 2–6 are graphs showing the relationship between viscosity and shear rate of several coating formulations.
Figure 3:
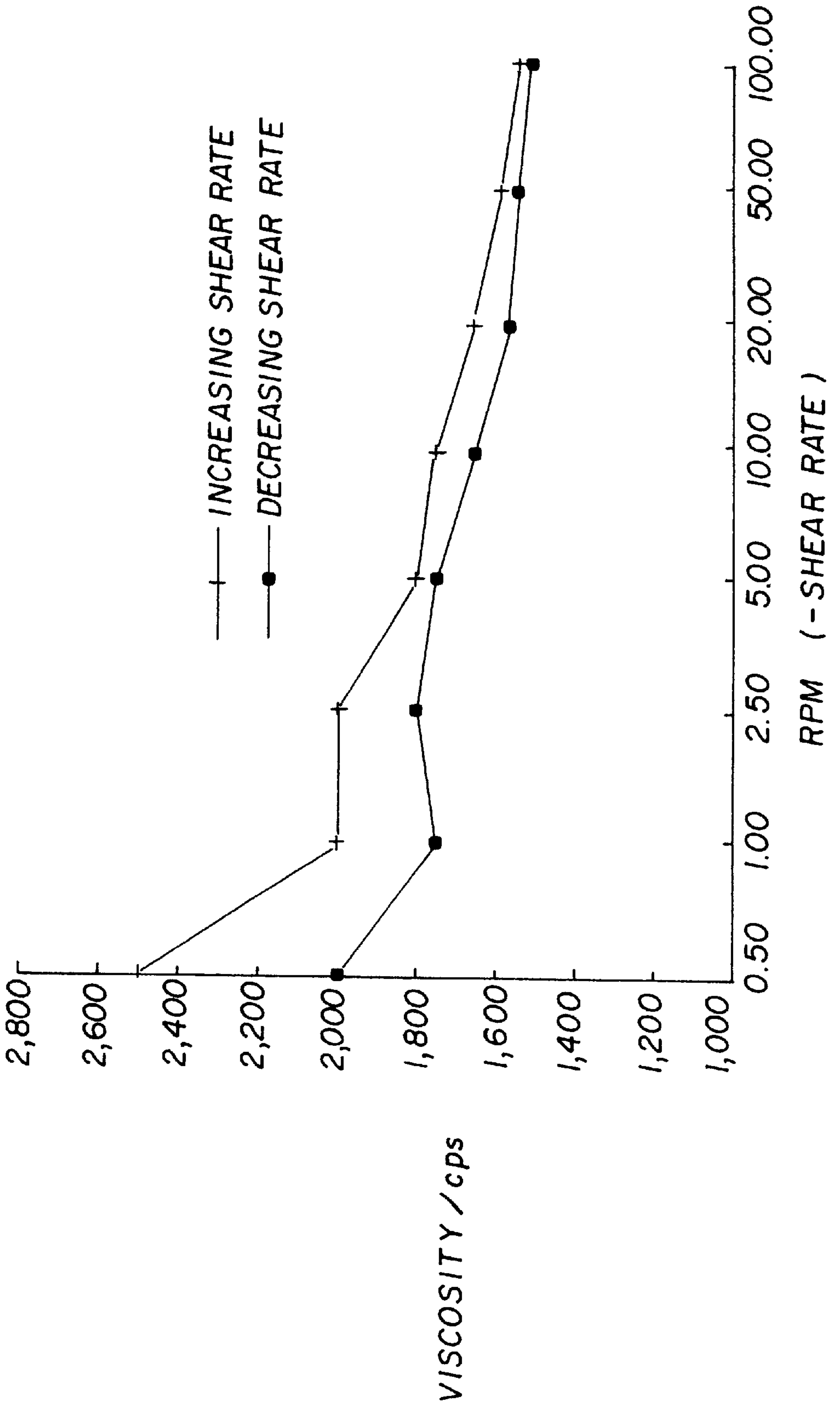
Figure 4:
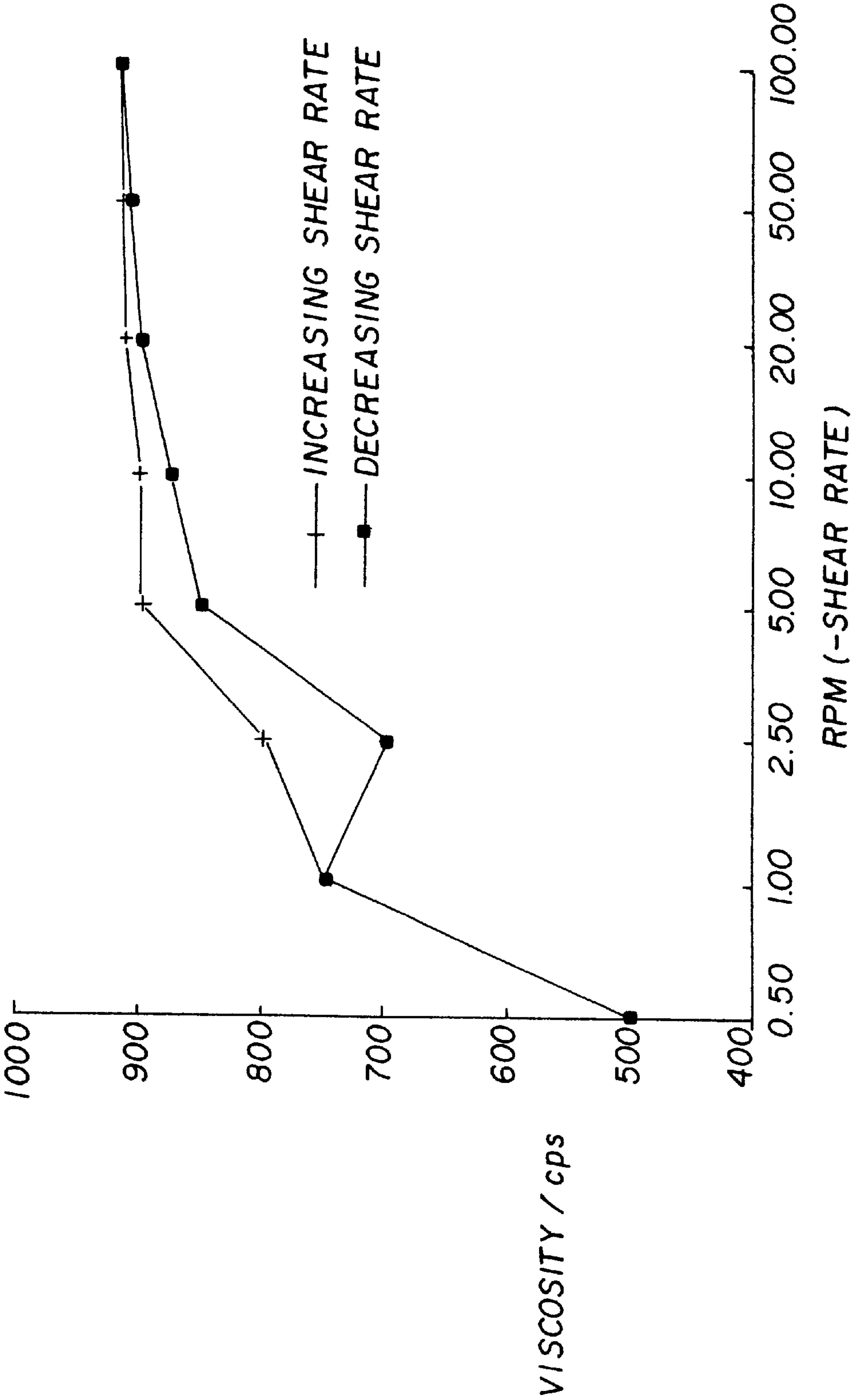
Figure 5:
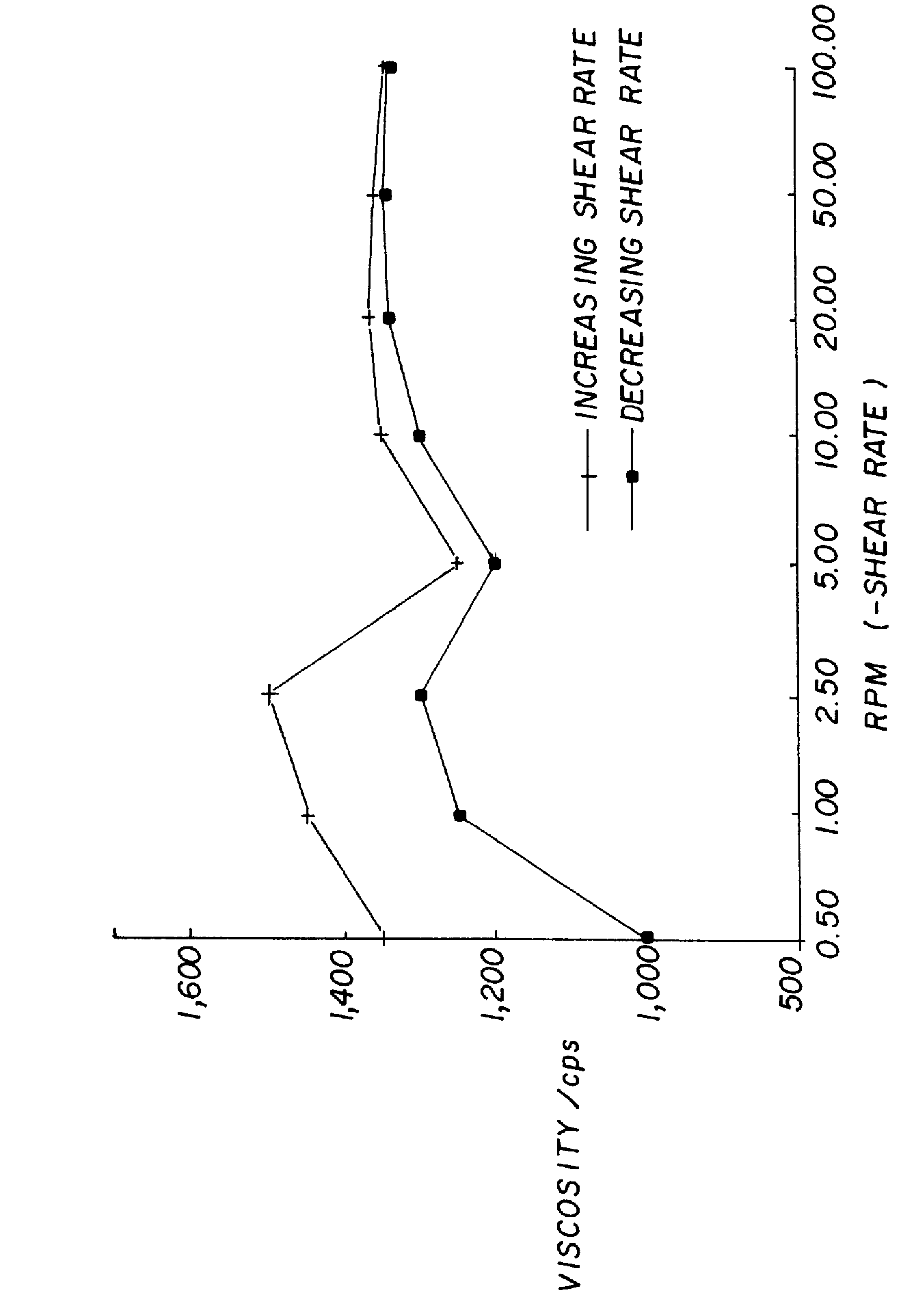
Figure 6:
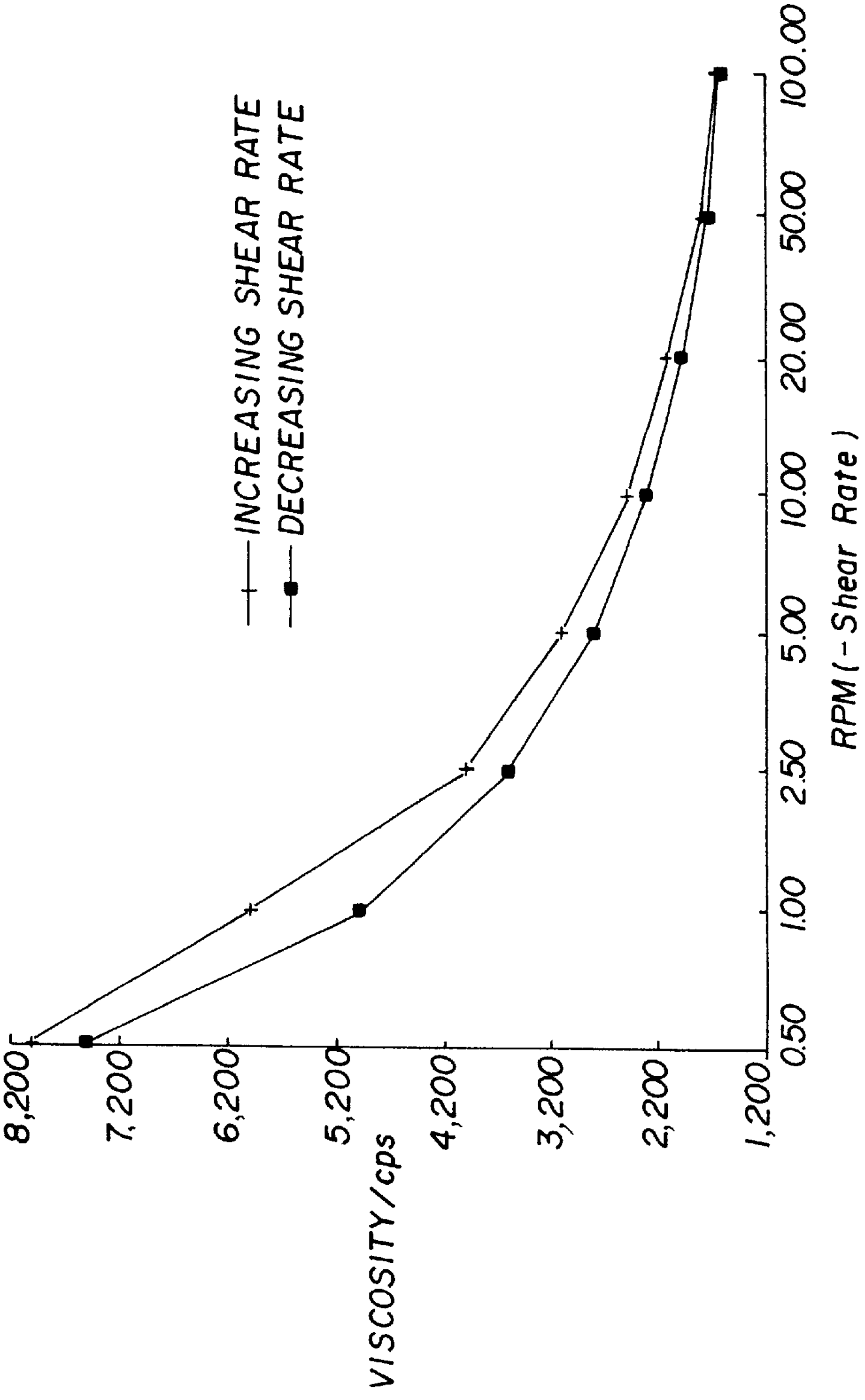

The present invention relates to a surface covering comprising at least one layer containing wear-resistant particles, like, aluminum oxide. Surface covering includes, but is not limited to, flooring, wall paper, countertops, automobile dash boards, automotive coatings, and the like. Particularly, preferred surface coverings are tiles, resilient flooring, slip-resistant flooring and the like.

The aluminum oxide that can be used in the present invention is also known as alumina or $Al_2O_3$. Preferably, the aluminum oxide is fused or calcined. The refractive index is preferably from about 1.4 to 1.7. Other wear-resistant particles include, but are znot limited to, carborundum, quartz, silica (sand), glass particles, glass beads, glass spheres (hollow and/or filled), plastic grits, silicon carbide, diamond dust (glass), hard plastics, reinforced polymers, organics, and the like, may be substituted for all or part of the alumina.

Also, while any source of aluminum oxide can be used, it is preferred that the aluminum Oxide have the following characteristics: fused or calcned and having a hardness of from about 6 to 9 on a Moh's scale, and most preferably about 9 on a Moh's scale. Preferably, the particle size of the wear-resistant particles is from about 10 microns to about 350 microns, and more preferably from about 20 microns to about 250 microns, and most preferably from about 30 microns to 200 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc. Birmingham, Ala.

Generally, a sufficient amount of the wear-resistant particles are present in at least one layer of the surface covering to provide improved wear and/or stain resistance to a surface covering as compared to no wear-resistant particles being present. Wear resistance can be determined by a Taber abrasion test, a Gardener Scrubber test, a walk test, and the like. The Taber abrasion test is more commonly used in the flooring industry. One way to determine stain resistance is by staining the sample with different stain amounts and removing the stain after about 1 to 5 hours with solvents. The stain remaining on the sample rated on a scale from 0 to 3, where 0 means no stain showing and 3 means the darkest, visible stain showing.

Preferably, from about 2 $g/m^2$ to about 50 $g/m^2$, and more preferably from about 4 $g/m^2$ to about 20 $g/m^2$ of wear-resistant particles are present in at least one layer of the surface covering. Alternatively from about 1% by weight to about 75% by weight of wear-resistant particles are present in a layer of the surface covering, more preferably, from about 5% to about 50% by weight based on the weight of the layer.

The wear-resistant particles, which are part of at least one layer of the surface covering, can be added in any manner known to those skilled in the art for adding particles to a layer. The wear-resistant particles can be mixed into a wet coating or scattered on top of a wet coating. For instance, the wear-resistant particles can be applied by a pellet dispenser which applies or sprinkles the particles on top of a layer which is still "wet" or uncured. By the layer being "wet" or uncured, the wear-resistant particles "stick" or adhere to the "wet" layer and at least a portion of the particles "sink" into the layer and thus are not exposed to the environment.

Several types of scattering machines can be used to accomplish the uniform sprinkling or dispensing of alumina or other hard particles. Normally the scattering machine has a rotating or applicator roll (engraved or knurled) at the bottom of the hopper. A stationary or rotary brush is used to remove particles from the dispensing or applicator roll. A shaker screen may be used under the hopper for uniform distribution of aluminum oxide or other hard particles. The knurl size, the dispensing or applicator roll speed, the brush position, the speed of the rotary brush, and the speed and the size of the shaker screen should all be selected based on the amount and the size of the wear-resistant particles to be used.

For example, to obtain a smooth-looking product, the coating thickness should be just sufficient to cover the wear-resistant particles when scattered on the wet coating. The other way to accomplish this is to use a multi-layer coat system. In this case, the particles are uniformly scattered on a wet base coat, and then after a partial, full, or no cure, another layer of top coat is applied on the base coat with or without wear-resistant particles in the top coat. For a smooth coating, the total thickness of the coating (different layers) should be greater than the largest particle size used. There are several combinations of this type of construction. For example, a construction can be used where the wear-resistant particles are placed at different locations in the top coat (see Tables 3 and 6). Another construction would be to sandwich the wear-resistant particles between two layers of coating. In this type of construction, the curing process is precisely controlled to have intercoat adhesion and other desired properties of the finished product.

In still another type of construction, the coating thickness and the particles size of the wear-resistant particles are chosen in a way that a desired portion of the particles sinks into the coating and the other part is exposed above the top coat. This gives the product very high wear resistance because the protruding particles offer high wear resistance.

The scattering of the wear-resistant particles should preferably be very uniform and precise. In a typical application, the particles are dispensed by industrial or lab scale dispensing machines such as the Christy Machine (Ohio, U.S.A.) or the Emil Paul Schilling AG Scattering Machine (Germany, Switzerland). Application of the particles by scattering machines gives several advantages over conventional method of mixing and other techniques.

For instance, solid vinyl (inlaid) coverings are preferably coated with 1.0–1.8 mil of acrylated urethane based UV-curable top coat. On the wet coat (in a typical application), about 5–15 g/m$^2$ of wear-resistant particles, like fused alumina with average particle size in the range of about 2540 microns are applied to this top coat by a modified Christy Machine or by a Schilling scattering machine and then the top coat is cured by UV-light employing either a direct or differential cure mechanism. Depending on the product specification, the amount of wear-resistant particles and the thickness of the coating can be varied. Also, for example, from about 15 to about 35 g/m$^2$ of wear-resistant particles (in a layer) in the particle size range of from about 50 to about 150 microns could be used in the production of non-slip coverings.

The size and the concentration of the wear-resistant particles should be optimized based on several properties of the finished products, such as wear resistance, flexibility, stain resistance, gloss, cleanability, appearance, etc. In a typical application, a coating thickness of from about 1.0 to about 1.8 mil with a particle size of about 25 to about 35 microns was used at a particle application rate of about 5 to about 15 grams/m$^2$ of a layer to achieve a smooth look. The particles sank into wet coating and were covered by the coating. The coating is then cured to achieve smoothness.

Once the wear-resistant particles are applied to the layer which is "wet" or uncured, the surface covering containing this layer is cured by means known to those skilled in the art, such as radiation curing, UV, electron beam, thermal and/or moisture curing, and the like.

While this "scattering" method, described above, is an effective way to incorporate wear-resistant particles into coating layers, the incorporation of more than 20% by weight wear-resistant particles, based on the weight of the layer, can be difficult due to agglomeration concerns and/or placing such a large amount of wear-resistant particles on top of the "wet" layer. When larger amounts of wear-resistant particles are intended to be included in a layer or when a more uniform distribution of wear-resistant particles throughout the entire thickness of the layer is preferred, then a more preferred embodiment would be to use a formulation to which the wear-resistant particles are added to and subsequently dispersed and maintained in suspension with the aid of a suspension aid.

In order to overcome the potential difficulty of maintaining wear-resistant particles in a coating medium or formulation, a method of incorporating wear-resistant particles, like alumina, and preferably high density wear-resistant particles, into a liquid coating medium or formulation for subsequent storage or cure is also part of the present invention. With the use of the particular formulation of the present invention, the storage and subsequent use of the coating medium or formulation containing the wear-resistant particles is possible without significant settling of the particles or the hard-packing of the wear-resistant particles. Also, higher amounts of wear-resistant particles can be incorporated into the layer without significant settling or agglomeration. Thus, with the present invention, it is possible, and even preferable, to use this formulation to incorporate wear-resistant particles into a liquid coating medium or formulation (prior to curing), such as liquid thermoplastic or thermosetting curable polymers or resins, like urethane-based polymers, urethane-acrylates, and the like.

In particular, a suspension aid is used to prevent the settling of the wear-resistant particles, such as alumina, in the liquid coating medium or formulation. Preferably, the suspension aid is a polymer comprising a polyamine amide, a polyamide, or an unsaturated polycarboxylic acid and more preferably is a high molecular weight version of one of these polymers. More preferably, the suspension aid is a polymer comprising a carboxylic acid salt of a polyamine amide, a phosphoric acid salt of a long chain carboxylic acid polyamine amide or a solution of a partial amide and alkylammonium salt of a higher molecular weight unsaturated polycarboxylic acid and polysiloxane copolymer. Any combinations or mixtures of various suspension aids can be used. Specific examples of such polymers include, but are not limited to, Anti-Terra® polymers from BYK CHEMIE. More preferred are the specific products Anti-Terra®-202, Anti-Terra®-205, Anti-Terra®-204, Anti-Terra®-P, Anti-Terra®-U-80, BYK-P-105, Anti-Terra® U and Lactimon type suspension aids, all available from BYK Chemie. Other specific examples of suspension aids include Disparlon®6500 polyamide thixotrope from King Industries. Other suitable suspension aids which can be used in the present invention are also described in U.S. Pat. No. 4,795,796 which is incorporated in its entirety herein by reference. Typically, a solvent, such as a non-aqueous solvent is present with the suspension aid, such as butyl acetate, xylene, PMA, methoxy propylacetate, alcohols (such as isobutanol and methoxypropanol) and the like.

Thus, a coating medium or formulation comprises a) wear-resistant particles, such as alumina, b) a suspension aid and c) a curable resin, such as a urethane-based resin or the like. A liquid coating medium or formulation can be made from these ingredients and can be added and/or mixed in any order. Preferably, all other ingredients, including the suspension aid, are added before the introduction of the wear-resistant particles. Further, it is preferred that all other ingredients, except for the wear-resistant particles are first compounded by any means, such as mixing, and then heated to a temperature sufficient to lower the viscosity of the formulation or mixture before introducing the wear-resistant particles.

More preferably, the curable resin is added and compounded and then the suspension aid is added and the mixture subjected to mixing and then the wear-resistant particles are added with further mixing. For instance, if a urethane-based resin is present, the formulation will typically be heated to a temperature of from about 190° F. to about 230° F. to lower the viscosity without causing any curing of the curable resin. Once all of the ingredients have been compounded, except for the wear-resistant particles and the suspension aid, and the temperature of the formulation is at an elevated state, the suspension aid can be added preferably under high shear rates and mixed thoroughly with the other ingredients. Then, this liquid formulation is preferably cooled (such as less than 100° F.) under agitation to a temperature which will increase the viscosity of the entire formulation. When the mixture is cooled, such as to ambient conditions, the wear-resistant particles can then be added under high shear mixing. Then, the liquid coating medium can be stored for subsequent use or can be immediately used in the formation of a coating layer, such as a top coat by means known to those skilled in the art in forming any other type of surface covering layers, such as roll coating and the like.

With high molecular weight suspension aids, heating with mixing is preferred, but such heating is unnecessary with lower molecular weight suspension aids, and mixing can occur at ambient temperatures.

Generally, the suspension aid is present in an amount sufficient to suspend the wear-resistant particles in the liquid coating medium or formulation for a period of time, preferably for at least one week, and more preferably for at least one month, and even more preferably for at least 3 months prior to any curing of the liquid coating medium or formulation. Other preferred periods of time of suspension of the wear-resistant particles include from about 1 week to about 6 months and more preferably from about 2 weeks to about 3 months, and most preferably from about 3 months to about 6 months. Preferably, the suspension aid is present in an amount of from about 0.5% by weight to about 1.25% by weight, and more preferably from about 0.10% by weight to about 1.0% by weight, and most preferably from about 0.20% by weight to about 1.0% by weight, based on the weight of the coating layer containing the suspension aid.

Further, with the use of the suspension aids of the present invention, the viscosity of a coating medium or formulation can be significantly increased during storage. For instance, the viscosity of a coating medium or formulation containing a curable resin, wear-resistant particles, and an effective amount of a suspension aid, can be increased from about 5 times to about 100 times, and more preferably from about 10 times to about 20 times compared to the same coating medium or formulation not having any suspension aid present. This increase in viscosity during storage or during no application of shear assists in maintaining the wear-resistant particles in suspension. Further, with the proper suspension aids in the coating medium or formulation, during shearing (e.g. from about 0.5 to about 100 rpm using a Brookfield [Thermosel] No. 27 spindle), the viscosity can be significantly lowered, such as on the order of 1 to 10 times which is advantageous when mixing the coating medium or formulation or applying the coating medium or formulation by a roU coater or other methods of coating where high shear can be used or other means to form a coating layer for subsequent curing.

When adding the suspension aid to a liquid coating medium, it is preferred that the liquid coating medium be subjected to high shear mixing conditions (e.g. about 700 rpm) until the suspension aid is substantially dispersed amongst the liquid coating medium and then with the introduction of the wear-resistant particles, it is preferred that the mixture be mixed at a higher shear rate, (e.g. such as 800 rpm) while the wear-resistant particles are being added to the liquid coating medium. Thereafter, when all ingredients have been added, it is preferred that the mixing rate of the mixture be significantly increased, such as to about 1800 rpm for about 30 minutes or until the wear-resistant particles are substantially dispersed uniformly in the liquid coating medium.

Preferably, an anti-foaming agent or defoamer is also present in the coating medium or formulation in effective amounts to reduce or prevent any foaming resulting from the high shear rates which are preferably used to introduce the wear-resistant particles into the coating mediums of the present invention.

If the particles are uniformly suspended in the coating at a fixed coating thickness and weight of the wear-resistant particles, the abrasion resistance will increase as the particle size is increased. Similarly, at a given coating thickness and wear-resistant particle size, the abrasion resistance will be governed by the weight or concentration of particles in the coating. Table 6 and FIG. 1 further exemplify this relationship.

The particle size of the wear-resistant particles is generally proportional to the wear resistance of the coating at a constant coating thickness and at a constant loading of the wear-resistant particles. In the same way, at a fixed coating thickness and particle size of the wear-resistant particles, the wear resistance of the cured coating is directly related to the weight of the wear-resistant particles incorporated in the coating.

The particle size of the wear-resistant particles are preferably equal to or higher (preferably from 10–60% higher) than the coating thickness in order to achieve high wear resistance. When the hard particles, such as alumina, protrude above the coating, these hard particles protect the coating from abrading. This method gives very high abrasion resistance to the product. However, when the wear-resistant particles are exposed or not covered by the coating, the particles may act as dirt catchers. Thus, depending on the end use of the product, the coating thickness, the particle size, and the amount of wear-resistant particles should be suitably selected.

The coating thickness and the particle size of wear-resistant particles should be selected depending on the required wear characteristics, product appearance, and other properties of the finished product such as stain resistance, flexibility, cleanability, aesthetics, slip resistance, tactile modification, and styling requirements.

Preferably, the wear-resistant particles are present in the outermost layer of a surface covering which is the layer subjected to the environment including foot traffic and other objects coming in contact with the surface covering. Generally, this outermost layer is known as the top coat layer or wear layer top coat. Typically, this wear layer top coat is made of a thermoplastic or thermosetting material, such as urethane or acrylic, melamine, polyvinylchloride, polyolefins, and the like. Preferably, the curable layer is a thermosetting urethane-based acrylate. For purposes of the present invention, curable resin encompasses thermoset and thermoplastic resins, including 100% solid-based and water-based resins and includes the resins mentioned above and below.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, multifunctional amine terminated acrylates, acrylate melamines, polyethylene and diene copolymers, and the like, can also be used, in place of the urethane based acrylates described above. Basically, the wear resistance of any surface or coating can be improved by the incorporation of wear-resistant particles, such as fused or calcined alumina.

In a preferred embodiment of the present invention, the surface covering is a resilient flooring which contains a resilient support surface. Applied to the top of and adhered to this resilient support surface is a wear surface. The wear surface can contain a wear layer base coat and a wear layer top coat. Also, an initial wear layer can be applied prior to the wear layer base coat which is adhered to the support surface. A strengthening layer can also be present and located anywhere in the resilient surface covering. Preferably, the strengthening layer is present and is in contact with the resilient support surface, The strengthening layer can comprise a vinyl resin and a polymerized, cross-linkable monomer and can even be disposed between two foam layers. The wear layer base coat preferably comprises a flexible, thermosettable, polymer composition. The wear layer top coat preferably comprises thermosettable, UV curable blend of acrylic or acrylate monomers or urethane. Typically, the top coat comprises a urethane layer and this urethane layer will contain the wear-resistant particles.

One preferred design of a surface covering wherein wear-resistant particles can be applied to a layer is described in U.S. Pat. No. 5,458,953, incorporated in its entirety by reference herein. The method of preparing this surface covering can also be used in the present invention with the additional step of adding the wear-resistant particles to one layer incorporated into this method.

Besides the above-described embodiments for incorporating wear-resistant particles into a coating layer, another method of incorporating wear-resistant particles into one or more coating layers involves the use of fumed silica or alumina or other similar types of materials as the suspension aid which have a submicron particle size range. Preferably, the submicron particle size range is from 5 to about 25 nm. Preferably, from about 0.10 to about 2.0% by weight (based on the weight of the layer) is used to provide effective suspension of wear-resistant particles. Examples of suitable particles include Aerosil® R972 and R974 as well as Aluminum Oxide C, all available from Degussa. These submicron particles are preferably added in the same order as the above-described suspension aids and preferably prior to the introduction of the wear-resistant particles.

In general, abrasion resistance of the coating or the substrate usually reflects the durability of the product. Abrasion is caused by mechanical actions such as sliding, scraping, rubbing, scuffing, etc. Abrasion results in wearing, marring, staining, and the loss of the surface properties, and eventually the bulk properties of the product.

The formulations containing the suspension aids of the present invention preferably maintain at least 25% by weight of the entire wear-resistant particles added in suspension for at least one month during storage and more preferably at least 40% by weight, and even more preferably at least 50% by weight and most preferably at least 75% by weight.

Abrasion resistance can be related to several properties of the substrate and coating such as hardness, cohesive strength, tensile strength, elasticity, toughness, thickness, etc.

Thus, to test the wear resistance of the product, several test methods have been followed: Some of them are 1) falling sand test ASTM D968; 2) air blast abrasive test ASTM D658; 3) jet abrader, method 6193 of Federal Test Method Standard # 141 C, 4) Taber abrader ASTM D4060; 5) NEMA test method LD 3.31; 7) walk test; 8) Taber scratch or modified Hoffman scratch test; and 9) Gardener scrub test, among others.

As stated earlier, with the addition of wear-resistant particles, preferably in the outermost layer exposed to the environment, improved wear and/or stain resistance are significant and lead to a better surface covering product for consumer use.

The present invention will be further clarified by the following examples, which are intended to be purely exemplary of the present invention.

EXAMPLES

In testing the product of the invention, the NEMA LD-3.31 test was modified by using 220 grit sandpaper with a 500 grams weight, and changing the paper every 500 cycles. The sandpaper was pasted onto CS-17 wheels supplied by Taber. In normal Taber abrasion test, CS-17 wheels are used with 1000 grams weight. The Gardener scrub test employs a 100 grit sandpaper with 577 grams weight.

This test determined the initial or final wear-through or a change in the surface property. In each set of tests, the product without alumina was used as the control.

As a representative of the several hard inorganic and organic material, different amounts of fused or calcined alumina with the characteristics described above were used in the following experiments:

Substrates: vinyl sheet goods (the construction is described in U.S. Pat. No. 5,405,674); solid vinyl tile; homogeneous vinyl sheet; and hardwood flooring.

The alumina was sprinkled on wet urethane based acrylate and mixture of acrylates and cured by UV-radiation. While alumina was used in the examples, other types of wear-resistant particles can be used.

Example 1

A homogenous vinyl sheet was prepared by forming a vinyl sheet, and on top of an urethane "wet" coat, aluminum oxide was scattered and then the coating cured.

TABLE 1

Effect of weight of fused alumina (aluminum oxide) on homogenous vinyl sheet.

| Weight of alumina (30 micron average particle size)g/m$^2$ | Gloss | # of Taber cycles to wear through the top coat[a] |
|---|---|---|
| 0 | 81 | 50 |
| 5 | 81 | 125 |
| 10 | 76 | 150 |
| 15 | 77 | 350 |
| 20 | 79 | 500 |

[a]Modified NEMA test LD3.31

From Table 1, it is clear that as the weight of alumina was increased, the wear resistance of the top coat also increased. Higher amounts of alumina could be incorporated depending on the wear resistance requirement. In a range of 1 g/m$^2$ to 50 g/m$^2$, the other desirable properties of the vinyl sheet goods were not affected. The preferred range of the weight of alumina is about 3 g/m$^2$ to about 40 g/m$^2$. The top coat thickness was varied from about 0.9 to about 1.5 mils. This is a typical example, but different particle sizes and amounts could be used.

Example 2

A sheet was made as in Example 1 but for the parameters set forth in Table 2.

TABLE 2

Effect of the particle size of alumina on the wear resistance of homogenous vinyl sheet

| Average particle size of alumina in microns | Weight of alumina (g/m$^2$) | No. of cycles to wear through the top coat[a] |
|---|---|---|
| 0 | 0 | 2500 |
| 30 | 15 | 3000 |
| 40 | 15 | 3750 |

[a]The abrasion was tested by Taber abrader with CS-17 shells with 1000 grams weight.

Example 3

The incorporation of alumina in the wear layer also increased the wear resistance of the homogenous vinyl sheet goods made as in Example 1, but for the parameters set forth in table 3.

TABLE 3

Effect of incorporation of alumina in the top coat of solid vinyl sheet (inlaid)

| Weight of alumina (g/m$^2$) | No. of cycles for initial wear through[a] |
|---|---|
| 0 | 50 |
| 5 | 75 |
| 10 | 125 |
| 15 | 150 |

[a]Modified NEMA test DL-3.31

Example 4

A two-layered floor product was made having an urethane-based-acrylate base coat and an urethane-based top coat on a vinyl sheet. Each of the samples had substantially the same thickness for each layer. The effects of wear-resistant particles on each layer can be seen in Table 4.

TABLE 4

Effect of placement of alumina on the wear resistance of solid vinyl sheet

| Average weight of alumina (average particle size 30 microns) in the base coat (g/m$^2$) | Average weight of alumina (average particle size 30 microns) in the top coat (g/m$^2$) | Average No. of cycles for initial wear through[a] |
|---|---|---|
| 0 | 0 | 100 |
| 25 | 25 | 1750 |
| 0 | 25 | 1350 |
| 0 | 15 | 1250 |
| 0 (Vinyl Wear Layer) | 0 | 100 |
| 0 (Vinyl Wear Layer) | 25 | 600 |
| 0 (Vinyl Wear Layer) | 15 | 500 |

[a]Modified NEMA test LD-3.31

Thus, by properly selecting the particle size, weight, and the location of alumina in a product construction, the desired wear resistance could be achieved.

Example 5

To demonstrate the excellent wear resistance by the incorporation of alumina in the top coat, a Gardener Scrubber test was also conducted on a sample like Example 4 and as described in Table 5.

Gardener Scrub Test Method:

The substrate was mounted onto a Gardener scrubber and scrubbed with a 100 grit sandpaper with 577 grams weight for 1000 cycles changing the sandpaper every 500 cycles. The substrate was then stained with oil brown to estimate the extent of wear. The extent of wear is directly related to the extent of staining, with a stain rating of 0 being no stain (excellent wear characteristics without any surface damage) and 3 being worse (with severe surface damage and the loss top-coat).

TABLE 5

Effect of incorporation of fused alumina into the top coat of solid vinyl sheet (inlaid) on its wear resistance

| Weight of alumina (average particle size 30 micron) incorporated into the top coat (g/m$^2$) | Stain rating after 1000 cycles of scrub |
|---|---|
| 0 | 3 |
| 5–7 | 0.5 |

In general, at a given particle size the wear resistance increases as a function of the amount of alumina (see Tables 1, 3, 4, and 6, and FIG. 1).

Example 6

In this Example, aluminum oxide was added to a urethane top coat which eventually formed part of a wood floor product. The conditions are described below.

The liquid urethane based acrylate was added into a 55 gallon drum, and then the defoamer was added and the mixture slowly mixed for one minute using a mixing speed of about 960 rpm. Afterwards, the suspension aid was added and the mixture was stirred for one more minute at the mixing speed of 960 rpm. Then, the aluminum oxide was slowly added and the vortex was just above the blade, but not down to the mixing blade.

As the aluminum oxide was added, the speed of the mixing blade was increased from 960 rpm to 1850 rpm to maintain the vortex level. The mixture was mixed for 35 minutes.

The viscosities of the resulting mixture were measured as shown in Table 8. Table 8 further shows two other formulations made in the same manner but for the type of aluminum oxide used.

TABLE 6

Aluminum Oxide in Wood Urethane Based Topcoat

| Sample | Number of Cycles for Initial Wear Through | Number of Cycles for Final Wear Through | Overall Coating Thickness in mils | Thickness of Base and Top Coats applied in mils | Number of Passes During Curing Process | Gloss Avg./Std. Dev |
|---|---|---|---|---|---|---|
| 1 | 159 | 752 | 1.5–1.6 | 0.5/1.0 | 2 | 79.8 ± 12.7 |
| 2 | 394 | 794 | 1.5–1.6 | 1.0/0.5 | 2 | 90.4 ± 1.5 |
| 3 | 528 | 662 | 1.6–1.8 | 1.5 | 1 | 72.4 ± 2.9 |
| 4 | 274 | 943 | 1.6–1.7 | 0.5/1.0 | 2 | 68.4 ± 18.1 |
| 5 | 529 | 957 | 1.8–2.0 | 1.0/0.5 | 2 | 82.8 ± 6.3 |
| 6 | 549 | 775 | 1.7–1.8 | 1.5 | 1 | 55.6 ± 1.7 |
| 7 | 97 | 223 | 1.4–1.6 | 0.5/1.0 | 2 | 84 ± 7.6 |
| 8 | 111 | 305 | 1.5–1.8 | 1.0/0.5 | 2 | 90.2 ± 1.3 |
| 9 | 78 | 143 | 1.3–1.5 | 1.5 | 1 | 80.6 ± 5.4 |

Notes:

Samples 1–3, aluminum oxide with average particle size of 25 microns used at 10 $g/m^2$ application rate.

Samples 4–6, aluminum oxide with average particle size of 25 microns used at 20 $g/m^2$ application rate.

Samples 7–9, no aluminum oxide used.

Aluminum oxide sifted through 400 mesh screen.

Application Method:

No. 6 mire rod used for 0.5 mil. draw.

No. 8 mire rod used for 1.0 mil. draw.

No. 14 mire rod used for 1.5 mil. draw.

TABLE 7

| Curing Conditions | Watts/Watts | Curing energy in milli Joules/$cm^2$ |
|---|---|---|
| First pass samples 1, 2, 4, 5, 7, and 8 | 125/off | 200 |
| Second pass samples 1, 2, 4, 5, 7, and 8 | 200/200 | 1030 |
| One pass cure sample 3, 6 | 200/200 | 1030 |

Example 7

A urethane coating containing wear-resistant particles was prepared as follows using the following ingredients:

Formula

| Ingredient | Weight (lbs) | Percent by wt. |
|---|---|---|
| Urethane based acrylate (U312 Photoglaze) from Lord Corporation | 265 | |
| BYK-088 Defoamer | 2.3 | 0.42 |
| Anti-Terra 204 Suspension Aid | 4.3 | 0.79 |
| Aluminum Oxide (WCA 50) | 271 | 50.0 |
| Total | 542 | |

Procedure for Mixing: Mixing was done on a Shar high shear mixer with a 2 inch diameter shaft, where the blade was set eight inches from the bottom of the drum. Blade diameter was eight inches. The single blade was a high shear saw-tooth blade.

TABLE 8

| | Brookfield viscosities (#4 spindle) cps | | |
|---|---|---|---|
| | Aluminum oxide Type | | |
| Brookfield rpm | WCA 50 | WCA 60 | ALR 180 |
| 20 rpm | 6300 | 8100 | 8700 |
| 5 rpm | 13200 | 16800 | 18000 |
| 0.5 rpm | 68000 | 80000 | 88000 |
| Time from mix | 3 hours | 2 hours | 2.5 hours |

Severs Viscometer Throughout, grams, Orifice dimensions: Length 5.00 cm. Diameter 0.155 cm.

TABLE 9

| Severs Pressure, psi | | | |
|---|---|---|---|
| 40 | 60.0 | 52.4 | 42.0 |
| 60 | 73.0 | 62.6 | 57.8 |
| 80 | 91.4 | 71.4 | 68.4 |
| Time from mix | 5 hours | 4.75 hours | 4.75 hours |

The average particle size for the aluminum oxide was: WCA 50=50 microns; ALR 180=150 microns; and WCA 60=60 microns.

The formulation was formed into a coating using an air knife coater and cured with the following parameters.

A. Air knife

Applicator roll speed=18 to 21 fpm

Applicator Roll Speed=0.61 setting

Air Knife Distance=0.18

Air Knife Angle=38.3

Air Knife Pressure=4.2 psi

B. UV curing conditions

| | | |
|---|---|---|
| First unit | lamp one | 125 W/in |
| | lamp two | 200 W/in |
| | lamp three | 125 W/in |

Second Unit lamp one=200 W/in

Aluminum Oxide materials:

WCA 50 and 60 are products from Micro Abrasives Corporation, 720 Southhampton Rd., Box 669, Westfield, Mass. 01086-0669

ALR 180 White Aluminum oxide is produced by Composition Materials, Co., Inc., 1375 Kings Highway East, Fairfield, Conn. 06430.

The cured coating was examined visually and appearance was acceptable.

Example 8

A cured urethane based acrylate (U337 from Lord Corporation) was made and tested as described in Table 10.

TABLE 10

In this example, 35% by weight of 30 micron aluminum oxide, 1% of suspension aid and 0.4% by weight of defoaming agent were mixed together to form formulations with radiation curable urethane based acrylates.
Substrate: Homogenous (solid) vinyl sheet (inlaid).
Curing: UV cured with medium pressure mercury lamps by a differential cure method known to them who practice the art of radiation curing. A total energy of 1800 to 2500 mJ/$cm^2$ was used.
Effect of different dispersing agent on the properties of the wet and cured urethane based acrylate

| Properties | Coating | D-161 | D-164 | D-170 | D-108 | ATU-80 |
|---|---|---|---|---|---|---|
| Type of susp. aid | — | HMW Polymer | HMW polymer | HMW polymer | LMW polymer | LMW polymer |
| % solids of susp. aid | — | 30 | 60 | 30 | 98 | 80 |
| Polarity/charge | — | polar | less polar | more polar | Cationic | Neutral |
| Nature | — | Deflocculating | Deflocculating | Deflocculating | Deflocculating | Deflocculating |
| Chemical Composition | — | Blk. copolymer with pigment affinic grs | | | C-acid test[a] | polyamine[b] |
| | | Viscosity in cps with Brookfield Spindle #4 | | | | |
| 20 RPM | 1550 | — | — | — | 2000 | 2200 |
| 5 RPM | 1400 | — | — | — | 2200 | 2600 |
| 0.5 RPM | — | — | — | — | 2000 | 4000 |
| Settling after 3 hours | — | Hard settle | Hard settle | Hard settle | none | none |
| After 2 days | — | — | — | — | ⅛" soft settle | none |
| After 5 days | — | — | — | — | soft ½" | soft ⅛" |
| After 15 days | — | — | — | — | Hard settle | Hard settle |
| Gloss | 23 | — | — | — | 26 | 25 |
| Coating thickness/mil | 1.3 | — | — | — | 1.5 | 1.6 |
| Taber Initial wear thro'/cys | 25 | — | — | — | 65 | 55 |
| Taber Final wear thro'/cys | 100 | — | — | — | 150 | 150 |
| Normalized initial wear (1.3 mil) | 25 | — | — | — | 56 | 45 |
| Normalized final wear (1.3 mil) | 100 | — | — | — | 130 | 122 |
| Stain Ambient | | — | — | — | | |
| Mustard | 0.0 | — | — | — | 0.0 | 0.0 |
| Oil Brown | 0.0 | — | — | — | 0.0 | 0.0 |
| Shoe Polish | 0.5 | — | — | — | 0.5 | 0.5 |
| Iodine | 3.0 | — | — | — | 3.0 | 3.0 |
| Asphalt | 0.0 | — | — | — | 0.0 | 0.0 |
| Sharpie Blue | 0.5 | — | — | — | 0.5 | 0.5 |
| Chem Lawn | 0.0 | — | — | — | 0.0 | 0.0 |
| Total Stain | 4.0 | — | — | — | 4.0 | 4.0 |

| Properties | Lact. | P105 | AT-204 | AT-P | Sprinkling |
|---|---|---|---|---|---|
| Type of susp. aid | LMW polymer | | | | — |
| % solids of susp. aid | 50 | 97 | 52 | 41 | — |
| Polarity/charge | Anionic | anionic | Neutral | Cationic | — |
| Nature | Deflocculating | Controlled flocculating | Controlled flocculating | Controlled Flocculating | — |
| Chemical Composition | amide-Si[c] | polycarcid[d] | polyamine[e] | Polyamine[f] | |
| | Viscosity in cps with Brookfield Spindle #4 | | | | |
| 20 RPM | 1800 | 2050 | 3300 | 2100 | — |
| 5 RPM | 2000 | 3200 | 5600 | 3000 | — |
| 0.5 RPM | 2000 | 7000 | 22000 | 6000 | — |
| Settling after 3 hours | none | none | none | none | — |
| After 2 days | ¾" soft settle | none | none | none | — |
| After 5 days | Hard settle | none | none | none | — |
| After 15 days | — | none | some clear coating on top* | some clear coating on top* | — |
| Gloss | — | 27 | 24 | 25 | 20 |

TABLE 10-continued

In this example, 35% by weight of 30 micron aluminum oxide, 1% of suspension aid and 0.4% by weight of defoaming agent were mixed together to form formulations with radiation curable urethane based acrylates.
Substrate: Homogenous (solid) vinyl sheet (inlaid).
Curing: UV cured with medium pressure mercury lamps by a differential cure method known to them who practice the art of radiation curing. A total energy of 1800 to 2500 mJ/cm$^2$ was used.
Effect of different dispersing agent on the properties of the wet and cured urethane based acrylate

| | | | | | |
|---|---|---|---|---|---|
| Coating thickness/mil | — | 1.9 | 2.2 | 1.7 | 1.5 |
| Taber Initial wear thro'/cys | — | 130 | 150 | 65 | 55 |
| Taber Final wear thro'/cys | — | 250 | 325 | 200 | 300 |
| Normalized initial wear (1.3 mil) | — | 89 | 87 | 50 | 48 |
| Normalized final wear (1.3 mil) | — | 171 | 192 | 153 | 260 |
| Stain Ambient | — | | | | |
| Mustard | — | 0.0 | 0.0 | 0.0 | 0.0 |
| Oil Brown | — | 0.0 | 0.0 | 0.0 | 0.0 |
| Shoe Polish | — | 0.5 | 0.5 | 0.5 | 0.5 |
| Iodine | — | 3.0 | 3.0 | 3.0 | 3.0 |
| Asphalt | — | 0.0 | 0.0 | 0.0 | 0.0 |
| Sharpie Blue | — | 0.5 | 0.5 | 0.5 | 0.5 |
| Chem Lawn | — | 0.0 | 0.0 | 0.0 | 0.0 |
| Total Stain | — | 4.0 | 4.0 | 4.0 | 4.0 |

[a]Hydroxyfunctionalcarboxylic acid ester with pigment affinic groups.
[b]Solutions of a salt unsaturated polyamine amides and lower molecular weight acid polymers.
[c]Solution of a partial amide and alkylammonium salt of a lower molecular weight unsaturated polycarboxylic acid polymer and polysiloxane copolymer.
[d]Lower molecular weight unsaturated polycarboxylic acid.
[e]Solution of a carboxylic acid salt of polyamine amides.
[f]Solution of a phosphoric acid salt of long chain carboxylic acid polyamine amides; Blk. — Blocks; grs. — groups.
*Some of the defoamer and part of the coating form a thin clear layer, however, there is not settling of aluminum oxide. Hard settle implies that the sample can not be mixed by hand with the aid of a spatula. Initial and final wear determined by modified NEMA LD-3.31 test 220 grit sand paper with 500 grams weight was used. Sand paper was changed every 500 cycles. Coating means coating without aluminum oxide. Sprinkling means 5–10 g/m$^2$ of aluminum oxide is sprinkled on the wet coating and then cured. HMW — High molecular weight; LMW — low molecular weight.

From Table 10, the following conclusions can be made.

1. Basic Deflocculating agents do not suspend aluminum oxide without hard settling.
2. Controlled flocculating agents aid the suspension of aluminum oxide without any hard settling. The formulations with controlled flocculating agents are more thixotropic (shear thinning) than those with flocculating agents.
3. Controlled flocculating agents increase the viscosity (measured at low shear rates) of the final formulation several times, which helps in suspending aluminum oxide.
4. Deflocculating agents do not increase viscosity at low shear rates to a greater extent compared to controlled flocculating agents. Thus, the deflocculating agents are not as effective as controlled flocculating agents in suspending aluminum oxide over long periods of time.

Example 9

A homogenous solid vinyl sheet was prepared with a urethane based acrylate topcoat having the following components.

Urethane based acrylate coatings with aluminum oxide: contain 30% by weight of aluminum oxide, 0.8% by weight of Anti-Terra-204 suspension aid and 0.4% by weight of a BYK088 defoamer. A coating was formed and cured at 1500–2500 mJ/cm$^2$ using medium pressure mercury vapor lamps.

Substrate: Homogenous (solid) vinyl sheet (inlaid)

TABLE 11

Effect of the type and particle size of alumina of the properties of top coat

| Properties | Control | 30 μCM | 40 μCM | 50 μCM | WCA30 | WCA40 | WCA50 | Sprink |
|---|---|---|---|---|---|---|---|---|
| Viscosity (Brookfield Spindle #4)/cps @ 76° F. | | | | | | | | |
| 20 rpm at RT/cps | 1300 | 2,500 | 2,500 | 2,350 | 2,500 | 2,300 | 2,350 | — |
| 5 rpm at RT/cps | 1400 | 4,000 | 3,800 | 3,400 | 3,600 | 3,400 | 3,400 | — |
| 0.5 rpm at RT/cps | — | 10,000 | 10,000 | 10,000 | 8,000 | 8,000 | 8,000 | — |
| Settling | — | minor | minor | minor | minor | minor | minor | — |

TABLE 11-continued

Effect of the type and particle size of alumina of the properties of top coat

| Properties | Control | 30 μCM | 40 μCM | 50 μCM | WCA30 | WCA40 | WCA50 | Sprink |
|---|---|---|---|---|---|---|---|---|
| 60° Gloss | 25–30 | 22–26 | 26–28 | 21–26 | 22–27 | 22–25 | 21–25 | 19–23 |
| Coating thickness/mil | 1.3 | 1.6 | 1.6 | 1.7 | 1.5 | 1.7 | 1.5 | 1.5 |
| Taber Initial wear/cy | 25 | 75 | 100 | 160* | 65 | 80 | 120* | 50 |
| Normalized initial wear | 25 | 61 | 81 | 122 | 56 | 61 | 104 | 43 |
| Surface defects | None | None | None | Streaks | None | None | Streaks | None |

*Sand paper changed after 100 cycles in the NEMA test.

Control—Does not contain any aluminum oxide.

Sprink—5–10 g/$m^2$ of aluminum oxide is sprinkled on the wet coating and then the coating is cured.

The particle size mentioned here is the average particle size.

The following observations were made:

1. Fused alumina (CM-Composition Material) offered more wear resistance than the calcined alumina (WCA aluminum oxide from Micro Abrasives).
2. Larger particle size alumina increased the wear resistance.
3. 40 micron alumina from Composition Material had the best balance of properties.
4. Incorporation of aluminum oxide in the coating increased the abrasion resistance of the coating. The abrasion resistance of the coating was determined by the amount and the size of the aluminum oxide used.
5. All the coatings containing aluminum oxide mentioned in Table 11 were shear thinning.

Example 10

A formulation containing urethane based acrylate resin (U337) aluminum oxide, a suspension aid as shown in table 12 was prepared and tested for settling properties.

TABLE 12

Effect of Suspension Aids (30% of 30 μ CM $Al_2O_3$ in coating) Aluminum oxide (30 micron from Composition Material) mixed in the following proportion:

| Sample | Suspension Aids | Wt. % of Susp. Aids | Wt. % of $Al_2O_3$ | Settling | Density g/cc |
|---|---|---|---|---|---|
| 1 | — | — | — | — | 1.08 |
| 2 | — | — | 30 | Hard settle | 1.38 |
| 3 | Disperbyk-161 | 1 | — | — | 1.08 |
| 4 | Disperbyk-161 | 1 | 30 | Hard settle | 1.39 |
| 5 | Anti-Terra-204 | 1 | 30 | None | 1.33 |
| 6 | Anti-Terra-204 | 1 | — | — | 1.09 |

The following observations were made.

1. Addition of the flocculating agent like Disperbyk does not change the density of the total formulation, and does not aid in the dispersion or suspension of aluminum oxide in the coating.
2. However, controlled flocculating agents like Anti-Terra-204 aid in the dispersion of aluminum oxide in the coating and also suspend the heavy aluminum oxide particles very well without hard settling.
3. The coating containing both Anti-Terra-204 and aluminum oxide was shear thinning and suitable for storage and subsequent use as shown in FIGS. 2–6 which show the viscosity of formulations containing suspension aids and aluminum oxide as well as controls.
4. The lower density of sample 5 compared to sample 2 indicated that Anti-Terra-204 stabilized the aluminum oxide particles in the coating by controlled flocculation.
5. From the viscosity measurements, as shown in FIGS. 2–6, it can be seen that the deflocculating agent like Disperbyk-161 did not increase the low shear viscosity of the final formulation with aluminum oxide. However, the use of controlled flocculating agents like Anti-Terra-204 increased the low shear viscosity of the final formulation significantly with a slight decrease in the bulk density of the formulation which aided the effective dispersion and the long term stability of the system.

Example 11

Solid vinyl (inlaid) sheet covering was made according to U.S. Pat. No. 5,670,237 and was coated with radiation curable urethane based acrylates containing aluminum oxide with 1% by wt. of controlled flocculating agent Anti-Terra-204, by a roll coater and air-knife. The wear resistance was measured and is shown in Table 13.

TABLE 13

| Properties | Coating w/o alumina | Coating + 26% by wt. alumina |
|---|---|---|
| Initial wear thro'/cy* | 25 | 50 |
| Stain performance | good | good |
| Gloss | 23 | 20–22 |

*NEMA test as mentioned before.

The following observations were made.

1. The coating containing the aluminum oxide could easily be processed on line similar to coatings without aluminum oxide.
2. The addition of aluminum oxide into the coating increased the wear resistance of the coating without affecting the gloss and the stain performance of the coating.

Example 12

A formulation containing 25% by weight of 30 micron fused alumina oxide with 1% of Anti-Terra-205 suspension aid and 0.4% of BYK088 as the antifoaming agent was prepared. The formulation was formed into a coating and cured as in Example 7. Table 14 sets forth some measured parameters.

TABLE 14

| Effect of Suspension Aid on Surface of Coating Containing Aluminum Oxide | |
|---|---|
| Properties | 30 μ |
| Brookfield Sp. #4 note temp. | 79° F. |
| 0.5 RPM/cps | 8000 |
| 5 RPM/cps | 3400 |
| 20 RPM/cps | 2300 |
| Coating Thickness/mil | 1.5 |
| Gloss | 18 |
| Taber Initial wear thro'/cys | 50 |
| Final wear thro'/Cys | 140 |
| Total stain rating | 4.0 |

As shown in Table 14, the suspension aid was an effective dispersant. Also, the cured coating had acceptable properties for use as a floor product.

Example 13

Sub-micron particles (5–25 nm) were used in combination with Anti-Terra-204 suspension aid to further enhance the dispersion of heavy particles such as fused or calcined aluminum oxide or other heavy or light solids in coatings or liquids.

Mixing procedure:

The sub-micron particles such as fumed alumina and fumed silica were incorporated into the coating by high shear mixing and then suspension aids like BYK-P-105, Anti-Terra-204 and Anti-Terra-P and the required amount of aluminum oxide were dispersed in the coating as described before. 0.1–5 wt. % of the sub-micron size fumed alumina or silica or combinations thereof were used in combination with the suspension aid.

Settling: The amount of clear coating separating on top of the formulation when subjected to 125° F. and measured as a function of time in inches to check the stability of the final formulations.

Fumed silica was Aerosil R972, Aerosil 974, Fumed alumina was: Aluminum oxide C. all are from Degussa Corp. Ridgefield Park, N.J. 07660 and 3500 Embassy Parkway, Akron, Ohio 44333-8327.

Coating: Radiation curable urethane based acrylates.

TABLE 16

| Properties | Fumed silica e.g., Aerosil R972 | Fumed silica e.g., Aerosil R974 | Fumed alumina, e.g., Aluminum oxide C |
|---|---|---|---|
| Average particle size | 16 | 12 | 13 |
| Surface area (sq.m/g) | 90–130 | 150–190 | 85–115 |
| Specific Gravity | 2.2 | 2.2 | 3.2 |
| pH of 45 slurry in water | 3.6–5.0 | 3.4–5.0 | 4.5–5.5 |

Example 14

Radiation curable urethane based acrylate was used and $Al_2O_3$ dispersed therein with 0.8% by wt. suspension aid (Anti-Terra-204). The coating was cured from 1100–1400 mJ/cm$^2$ in an inert atmosphere using medium pressure mercury lamps. Table 17 shows the results.

TABLE 17

Effect of aluminum oxide mixed into top coat of PVC floor Covering

| Properties | 0% $Al_2O_3$ | 5% $Al_2O_3$ | 10% $Al_2O_3$ | 15% $Al_2O_3$ | 20% $Al_2O_3$ |
|---|---|---|---|---|---|
| Coating thickness (mil) | 1.4 | 1.4 | 1.5 | 1.4 | 1.4 |
| Mean gloss at 60° measured by Gloss meter | 77.9 | 60.4 | 56.0 | 49.0 | 46.4 |
| Initial wear through* (No. of cycles) | 60 | 75 | 100 | 100 | 125 |

TABLE 15

Effect of ultra-fine (nm Size) silica and alumina particles as suspension enhancing agents

| Formulation/Properties | Formulation-1 | Formulation-2 | Formulation-3 | Formulation-4 | Formulation-5 | Formulation-6 | Formulation-7 (Control) |
|---|---|---|---|---|---|---|---|
| Aerosil-R972 | 0.5 wt. % | 2.0 wt. % | — | — | — | — | — |
| Aerosil-R974 | — | — | 0.5 wt. % | 2.0 wt. % | — | — | — |
| Aluminum Oxide C | — | — | — | — | 0.5 wt. % | 2.0 wt. % | — |
| Anti-Terra-204 | 1 wt. % | 1 wt. % | 1 wt. % | 1 wt. % | 1 wt. % | 1 wt. % | 1 wt. % |
| 30μ fused $Al_2O_3$ | 30 wt. % | 30 wt. % | 30 wt. % | 30 wt. % | 30 wt. % | 30 wt. % | 30 wt. % |
| Viscosity Brookfield with spindle #4 measured at 73° F. (room temperature) | | | | | | | |
| 0.5 RPM | 30,000 | 104,000 | 38,000 | 156,000 | 12,000 | 16,000 | 12,000 |
| 5 RPM | 8,800 | 22,200 | 10,800 | 29,200 | 5,000 | 7,400 | 4,400 |
| 20 RPM | 5,200 | — | 6,300 | — | 3,300 | 4,800 | 3,000 |
| Settling (the clear layer of liquid on top of the coating was measured in inches at 125° F.) more clear layer indicates more settling | | | | | | | |
| 16 hours | none | none | none | none | ⅛" | none | ⅛" |
| 24 hours | none | none | none | none | ⅛" | none | ⅛" |
| 64 hours | ⅛" | none | none | none | ¼" | none | 3/16" |
| 136 hours | ¼" | none | 1/16" | none | ½" | none | 9/16" |
| 160 hours | ¼" | none | 1/16" | none | ½" | none | ⅝" |

TABLE 17-continued

Effect of aluminum oxide mixed into top coat of PVC floor Covering

| Properties | 0% $Al_2O_3$ | 5% $Al_2O_3$ | 10% $Al_2O_3$ | 15% $Al_2O_3$ | 20% $Al_2O_3$ |
|---|---|---|---|---|---|
| Final wear through (No. of cycles) | 130 | 225 | 350 | 400 | 500 |
| Stain resistance@ | 9.5 | 9.5 | 12 | 12 | 12 |

*The wear resistance is determined by the modified NEMA test as described before.
@The lower the number, the better the stain resistance. This reflects the stain resistance of the coating to different stains.

The following observations were made.

1. This example shows that by properly selecting the amount of aluminum oxide in the coating, the desired wear resistance can be achieved.
2. Addition of aluminum oxide into a high gloss coating decreases the gloss of the coating. However, the desired gloss level could be achieved by properly selecting the particle size and the concentration.
3. Depending on the amount and the particle size of aluminum oxide the slip resistance of the product could also be increased.
4. The preferred particle sizes are 15–300 microns, more preferably 20–200 microns.
5. In this example, fused aluminum oxide was used, basically any hard particles could be used.
6. The aluminum oxide can stay suspended in the coating from a week to 6 months at room temperature.

Example 15

In this example, the effects of just using a submicron particle, such as fumed silica or fumed alumina as the suspension aid was determined. In particular, in a mixture of urethane-based acrylate and either fumed or calcined aluminum oxide mixed at a speed of at about 660–700 m/min, the submicron material was added. The Degussa R972 fumed silica was added in an amount of about 1% by weight to the mixture containing fumed aluminum oxide and about 5% by weight fumed silica was added to the mixture containing the calcined aluminum oxide with the curable resin being a urethane based acrylate from Lord Corporation. After mixing, the formulations were studied for at least two days and after two days it was observed that the aluminum oxide wear resistant particles were still substantially suspended in the formulation thus showing the ability of the submicron particles to suspend the wear-resistant particles. The submicron particles, which act as suspension aids, had a significant increase in the viscosity of the formulation thus assisting in the suspension of the wear-resistant particles. A control was used which had no submicron particles present, but had aluminum oxide wear-resistant particles present and severe settling occurred in the first and second days of the study. The formulations were then cured by a 200/200 watt UV lamp to show that the formulations were usable as coatings.

Example 16

A urethane based acrylate coating was prepared using the amounts and specific ingredients set forth in Table 18. The formulation was then formed into a coating and cured using the procedures set forth in Example 7 and the various properties set forth in Table 18 were measured. As can be seen from the measured properties, the use of a suspension aid and wear-resistant particles had a substantial effect on coefficience of friction, thus showing a significantly improved slip-resistant product which could be used in surface coverings, especially floor coverings.

TABLE 18

Aluminum Oxide Combinations and Effect on Coefficients of Friction

| | Formula Number | | | | | | | Control |
|---|---|---|---|---|---|---|---|---|
| Ingredient | 1 | 2 | 3 | 4 | 5 | 6 | 7 | (no Al Oxide) |
| Urethane (U312) | 147 | 147 | 147 | 147 | 147 | 147 | 147 | |
| BYK-088 | 1.3 | 1.3 | 1.3 | 1.3 | 1.3 | 1.3 | 1.3 | |
| Anti-Terra 204 | 2.4 | 2.4 | 2.4 | 2.4 | 2.4 | 2.4 | 2.4 | |
| Comp Mat 30 | 150 | 120 | 100 | 75 | 50 | 30 | 0 | |
| WCA 50 | 0 | 30 | 50 | 75 | 100 | 120 | 150 | |
| Coefficients of Friction | | | | | | | | |
| Leather | 0.59 | 0.67 | 0.65 | 0.62 | 0.69 | 0.60 | 0.68 | 0.48 |
| Wet Neolite | 0.24 | 0.23 | 0.24 | 0.24 | 0.25 | 0.24 | 0.29 | 0.18 |
| Viscosities Brookfield, cps | | | | | | | | |
| 20 RPM | 5700 | 8000 | 5400 | 6800 | 5500 | 6100 | 6900 | 1900 |
| 5 RPM | 12400 | 19800 | 10800 | 13600 | 10600 | 13600 | 15600 | 3200 |
| 0.5 RPM | 66000 | 114000 | 48000 | 72000 | 44000 | 72000 | 84000 | 12000 |

U-312 is a urethane coating provided by Lord. Corp.
Comp Mat 30 is an aluminum oxide provided by Composition Materials (180 Mesh).
WCA 50 is an aluminum oxide made by Microabrasives.

Other embodiments of the present invention will be apparent to those skilled in the art from consideration of the present specification and practice of the present invention disclosed herein. It is intended that the present specification and examples be considered as exemplary only with the true scope and spirit of the present invention being indicated by the following claims.

What is claimed is:

1. A liquid formulation for a surface covering layer comprising a curable resin; a suspension aid comprising a polyamine amide, a polyamide, or an unsaturated polycarboxylic acid; and wear-resistant particles, wherein said suspension aid and said wear resistant particles are dispersed throughout the curable resin.

2. The liquid formulation of claim 1, wherein said curable resin is a thermosetting resin.

3. The liquid formulation of claim 1, wherein said curable resin is a urethane based polymer or oligomer.

4. The liquid formulation of claim 1, wherein said curable resin is a urethane based acrylate.

5. The liquid formulation of claim 1, wherein said curable resin is a thermoplastic resin.

6. The liquid formulation of claim 1, wherein said wear-resistant particles are aluminum oxide.

7. The liquid formulation of claim 1, wherein said wear-resistant particles comprise carborandum, quartz, silica, glass particles, or combinations thereof.

8. The liquid formulation of claim 1, wherein the wear-resistant particles are substantially and uniformly suspended in the liquid formulation.

9. The liquid formulation of claim 1, wherein the wear-resistant particles are present in an amount of from about 1% by weight to about 75% by weight, based on the weight of the liquid formulation.

10. The liquid formulation of claim 1, wherein the wear-resistant particle are present in an amount of from about 1% to about 50% by weight, based on the weight of weight of the liquid formulation.

11. The liquid formulation of claim 1, wherein said suspension aid is a carboxylic acid salt of a polyamine amide, a phosphoric acid salt of a long chain carboxylic acid polyamine amide, or a solution of a partial amide and alkylammonium salt of a higher molecular weight unsaturated polycarboxylic acid and polysiloxane copolymer.

12. The liquid formulation of claim 1, further comprising a defoaming agent.

13. The liquid formulation of claim 1, wherein the curable resin is a urethane based resin, the wear-resistant particles are substantially and uniformly suspended in the liquid formulation and are present in an amount of from about 1% to about 50% by weight, based on the weight of the liquid formulation; and the suspension aid is present in an amount of from about 0.10% by weight to about 1.25% by weight, based on the weight of the liquid formulation.

14. A surface covering comprising a cured layer comprising a curable resin; a suspension aid comprising a polyamine amide, a polyamide, or an unsaturated polycarboxylic acid; and wear-resistant particles dispersed throughout the layer.

15. The surface covering of claim 14, wherein the surface covering is a resilient surface covering.

16. The surface covering of claim 14, wherein the layer is a wear layer.

17. The surface covering of claim 16, wherein said wear layer contains a bottom coat layer and a top coat layer or an outermost layer and wherein said top coat layer or said outermost layer is the layer containing the suspension aid and wear-resistant particles.

18. The surface covering of claim 17, wherein said surface covering comprises a bottom coat layer comprising polyvinylchloride and a urethane based acrylate top coat layer.

19. The surface covering of claim 17, wherein said bottom coat layer comprises polyvinyl chloride.

20. The surface covering of claim 14, wherein the wear-resistant particles are aluminum oxide.

21. The surface covering of claim 20, wherein said aluminum oxide is calcined or fused.

22. The surface covering of claim 14, wherein the wear-resistant particles comprise carborandum, quartz, silica, glass particles, or combinations thereof.

23. The surface covering of claim 14, wherein said wear-resistant particles are present in an amount of from about 1% by weight to about 75% by weight, based on the weight of the layer.

24. The surface covering of claim 14, wherein said wear-resistant particles are present in an amount of from about 1% to about 50% by weight based on the weight of the layer.

25. The surface covering of claim 14, wherein said wear-resistant particles are present in an amount of from about 1% to about 50% by weight, the suspension aid is present in an amount of from about 0.10% to about 1.25% by weight, and the cured resin is present in an amount of from about 50% to about 90% by weight, based on the weight of the layer.

26. The surface covering of claim 14, wherein said suspension aid is a carboxylic acid salt of a polyamine amide, a phosphoric acid salt of a long chain carboxylic acid polyamine amide, or a solution of a partial amide and alkylammonium salt of a higher molecular weight unsaturated polycarboxylic acid and polysiloxane copolymer.

27. The surface covering of claim 14, further comprising a defoaming agent.

28. The surface covering of claim 14, wherein said wear-resistant particles have an average particle size of form about 20 to about 250 microns.

29. The surface covering of claim 14, wherein the surface covering is a tile.

30. The surface covering of claim 14, wherein the surface covering is a wood floor product.

31. The surface covering of claim 14, wherein the surface covering is a slip resistant product.

32. A method to make a surface covering having wear-resistant particles suspended therein, comprising mixing together a) a liquid curable resin, b) a suspension aid comprising a polyamine amide, a polyamide, or an unsaturated polycarboxylic acid; and c) wear-resistant particles to form a formulation;

forming a layer from said liquid formulation; and curing said layer.

33. The method of claim 32, wherein said curable resin is mixed with the suspension aid and then said wear-resistant particles are introduced and mixed to form said formulation.

34. The method of claim 32, wherein said curable resin and said suspension aid are mixed together and then subjected to elevated temperatures of from about 150° F. to about 230° F., and then said wear-resistant particles are added and mixed together with the curable resin and suspension aid.

* * * * *

UNITED STATES PATENT AND TRADEMARK OFFICE
CERTIFICATE OF CORRECTION

PATENT NO. : 6,218,001 B1
DATED : April 17, 2001
INVENTOR(S) : Chen, et al.

It is certified that error appears in the above-identified patent and that said Letters Patent is hereby corrected as shown below:

Title page,
Item [75], Inventor: the address of Hao A. Chen is incorrectly shown as Chaddis Ford, PA", it should read -- Chadds Ford, PA --.

Signed and Sealed this

Sixteenth Day of October, 2001

*Attest:*

Nicholas P. Godici

NICHOLAS P. GODICI

*Attesting Officer* *Acting Director of the United States Patent and Trademark Office*